United States Patent [19]

Flemming et al.

[11] 4,088,058

[45] May 9, 1978

[54] SYSTEM FOR THE TEMPORARY SEALING OF THE INTERIOR OF ARMORED VEHICLES, ESPECIALLY TANKS, AGAINST THE PENETRATION OF LIQUID OR GASEOUS SUBSTANCES

[75] Inventors: Karl-Heinz Flemming, Kassel; Peter Grünewald, Fuldabruck, both of Germany

[73] Assignee: Wegmann & Co., Kassel, Germany

[21] Appl. No.: 740,629

[22] Filed: Nov. 10, 1976

[30] Foreign Application Priority Data

Nov. 14, 1975 Germany .............................. 2551086

[51] Int. Cl.² .............................................. F41H 7/02
[52] U.S. Cl. .................................... 89/36 K; 180/1 H
[58] Field of Search ............. 89/36 K, 36 L; 61/69 R; 180/1 H; 114/16 D, 175, 201 A, 212

[56] References Cited

U.S. PATENT DOCUMENTS

| 184,955 | 12/1876 | Condon | 114/212 |
|---|---|---|---|
| 1,363,937 | 12/1920 | Wagner | 89/36 K |
| 2,361,298 | 10/1944 | Laddon | 89/36 K |
| 2,745,317 | 5/1956 | Stanton et al. | 89/36 K |

FOREIGN PATENT DOCUMENTS

| 826,322 | 3/1938 | France | 89/36 K |
|---|---|---|---|
| 58,694 | 11/1967 | Germany | 114/201 A |

*Primary Examiner*—Stephen C. Bentley
*Attorney, Agent, or Firm*—Burgess, Dinklage & Sprung

[57] ABSTRACT

A system for the temporary sealing of the interior of an armored vehicle, especially tanks, against the penetration of liquid or gaseous substances is disclosed. The system is characterized by a tubular seal connected to a central operating system disposed in the interior of the armored vehicle. The vehicle is equipped with at least one ventilation aperture provided in an exterior wall of the armored vehicle which wall defines an interior of the same. The ventilation aperture comprises a ventilation valve in an aperture responsive to compressed air. The ventilation valve is connected to the central operating system and has provided thereover a protective device disposed on the exterior of the armored vehicle. Preferably, the tubular seal within a groove on the chassis or on the turret of a tank.

8 Claims, 5 Drawing Figures

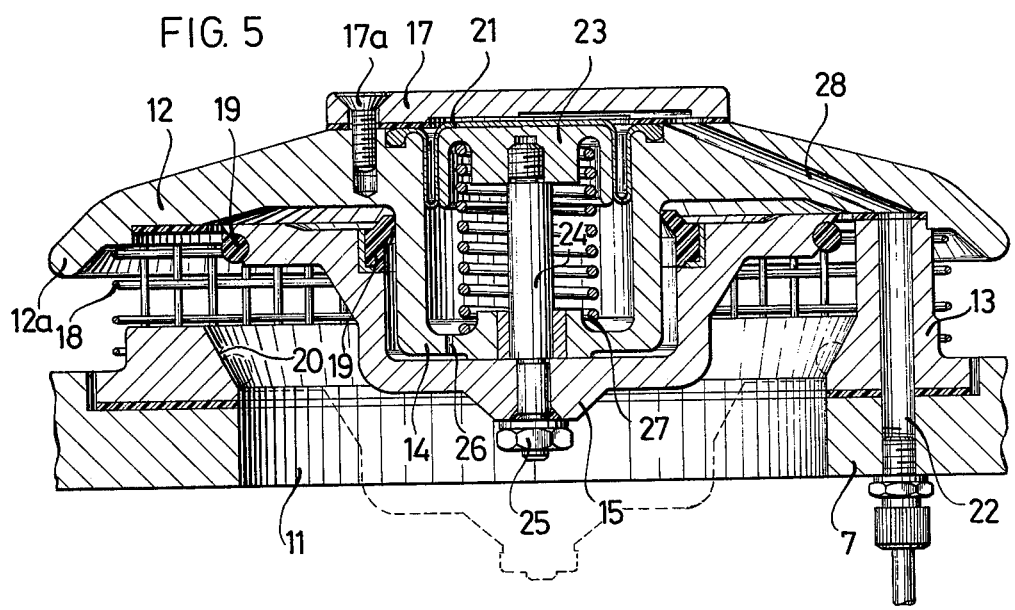

SYSTEM FOR THE TEMPORARY SEALING OF THE INTERIOR OF ARMORED VEHICLES, ESPECIALLY TANKS, AGAINST THE PENETRATION OF LIQUID OR GASEOUS SUBSTANCES

BACKGROUND OF THE INVENTION

1. Field of the Invention

The invention relates to a means for the temporary sealing of the interior of armored vehicles, especially tanks, against the penetration of liquid or gaseous substances.

2. Discussion of the Prior Art

When an armored vehicle, such as a tank for example, has to ford a body of water, care must be taken that no water can penetrate to the interior of the vehicle. This means that all openings leading out from the interior of the vehicle must be sealed. The permanent sealing of all openings leading from the interior to the open air is not possible on the one hand because the interior of the vehicle must be sufficiently ventilated when it is not traveling in the body of water, and on the other hand there are openings between parts which are rotatable one on the other, in the area, for example, of the rotating track between the turret and the chassis of a tank, which are difficult to seal in such a manner as to preserve the rotatability of the parts.

The object of the invention is to provide a system for the temporary sealing of the interior of armored vehicles, especially tanks, against the penetration of liquid or gaseous substances, which can be rapidly engaged and disengaged by the crew without leaving the vehicle, while providing the assurance of sufficient ballistic protection of all the apparatus necessary to this end.

SUMMARY OF THE INVENTION

Broadly this invention contemplates an armored vehicle having an interior, said interior being in fluid communication via at least one temporarily-to-be-closed aperture with the exterior atmosphere around said vehicle, said aperture sealed against penetration of liquid or gaseous substances by a tubular seal connected to a central operating system disposed in the interior thereof, said vehicle being equipped with at least one ventilation aperture provided in the exterior wall of said vehicle defining the interior of said vehicle, said ventilation aperture comprising a ventilation valve in said aperture responsive to compressed air, said valve connected to said central operating system, said ventilating aperture having a protective device disposed thereon on the exterior thereof.

The solution to the aforementioned problem is achieved according to invention, in that the sealing of openings which are to be sealed only temporarily is accomplished by tubular sealing means which are inflatable by compressed air, and which are connected to a control center disposed in the interior, and, additionally, at least one ventilation aperture is provided in the outside wall, which is closable by a ventilation valve which is likewise operable by compressed air, each ventilation aperture being provided with a protective means disposed on the exterior side of the outside wall.

The system of the invention has the advantage that any number of sealing points which are provided with a tubular sealing means in the manner of the invention can be connected to the control center contained within the vehicle.

In one especially advantageous embodiment of the system of the invention, which is used in a tank having a turret rotatably disposed on a chassis by means of a rotating track, a tubular seal inflatable by compressed air is, in accordance with the further invention, disposed in a groove provided on the turret or on the chassis, coaxially with the axis of rotation of the turret within the rotating track, and is applied under pressure to a sealing surface disposed on the chassis or frame, as the case may be. In order to achieve an especially good seal, it has been found desirable for the tubular seal to be provided, on the side facing the sealing surface, with lips or ribs extending in the longitudinal direction of the seal. To prevent the tubular seal from being worn or damaged by the turning of the turret when the sealing system is shut off, it is futhermore desirable for the tubular seal to be so designed that it will be retracted entirely within the groove. This can be accomplished, for example, by providing the tubular seal with a concave profile in its transverse direction on the side facing the sealing surface.

To prevent the tubular seal from slipping out of the circumferential groove in the turret, it has proven desirable for the width of the groove to be smaller adjacent its outer edge than adjacent its bottom.

Testing and monitoring instruments can be connected to the control center in the interior to indicate the air pressure in the tubular seals. Thus the crew of the vehicle can determine at any time, from the interior of the vehicle, whether the system is on or off and is in a trouble-free condition.

The ventilation openings provided in the outside wall constitute gaps in the armor which under certain circumstances create a deficiency of ballistic protection. For this reason, a protective device is provided, as previously mentioned, for the ventilation apertures. According to the further invention, this protective device can be a shield or guard disposed over the ventilation aperture and attached by bolts from the exterior, leaving lateral openings free, on which guard the ventilation valve is disposed, the cone of said valve being disposed between the said guard and the ventilation aperture, and the valve seat being provided at the margin of the ventilation aperture. In one especially advantageous embodiment, the guard has a central, cup-like cavity which can be closed by a bolted-on cover plate, and in which there is guided a compressed air piston which is connected to the valve cone by a connecting rod passing through the floor of the cavity, and whose working surface is connected by a diaphragm to the outer rim of the cup, the radial size of the diaphragm being adapted to the given stroke of the piston and the space between the diaphragm and the cover plate being supplied with compressed air, and a compression spring being provided between the piston and the floor of the cavity.

This construction and arrangement of the ventilation valve is particularly simple and trouble-free. Furthermore, this ventilation valve can be taken apart with simple tools, so that all parts subject to wear, such as for example the diaphragm or the sealing ring of the valve cone, are easily and quickly replaceable.

It has furthermore proven to be desirable for the valve cone to envelop the cup-like cavity, a sealing sleeve being disposed between the outside wall of the cavity and the inside wall of the valve cone. In this manner the penetration of water between the valve cone and the cup-like cavity is prevented, thus preventing the connecting rod of the compressed air piston from freezing fast at temperatures below 0° C.

To prevent any relatively large foreign body from penetrating into the interior of the vehicle, it is furthermore advantageous for the through passages between the guard and the ventilation aperture to be provided with a protective grille.

Of course, the apparatus of the invention is usable for the protection of the interior not only against the penetration of water when fording bodies of water, but also against the penetration of liquid or gaseous weapons into the interior of the vehicle.

BRIEF DESCRIPTION OF DRAWINGS

The invention can be more readily understood and appreciated when reference is made to the accompanying drawings in which:

FIG. 5 is a cross-sectional view taken along line V—V of FIG. 3, each on a larger scale.

DESCRIPTION OF SPECIFIC EMBODIMENT

Figure 1:
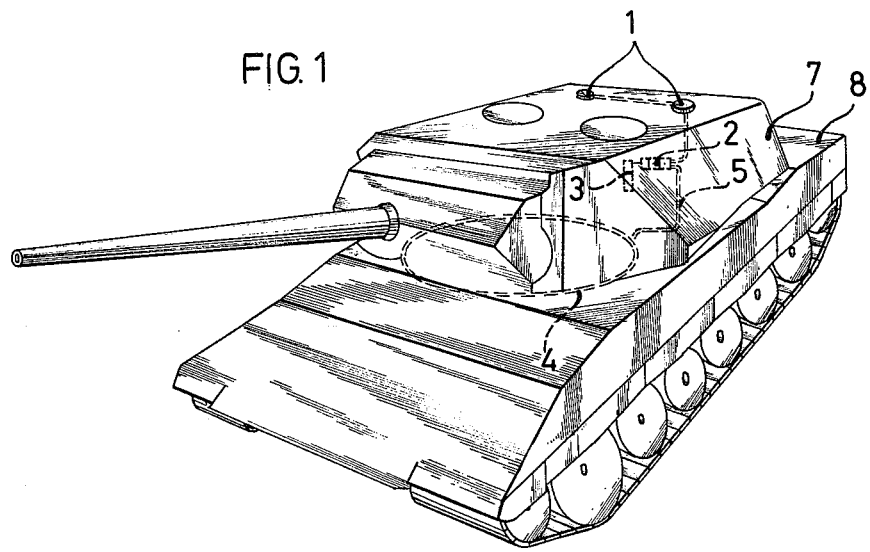
FIG. 1 is a diagrammatic perspective representation of a tank in which the disposition of the apparatus of the invention is indicated.

The tank represented in FIG. 1 has in its turret casing 7 two ventilation points 1 which consist of a ventilation aperture with a ventilation valve that will be described further below. Furthermore, around the area of the turret rotating track between the turret casing 7 and the chassis 8 there is disposed, in a manner to be described further below, a tubular seal 4 which is connected by a compressed air line 5 to a control center 2 disposed in the interior of the vehicle, and can be connected by said control center to a compressed air source 3. Also the ventilation points 1 are connectable to the compressed air source 3 through the control center 2.

Additional sealing points provided with a tubular seal can, of course, be connected to the control center 2.

Figure 2:
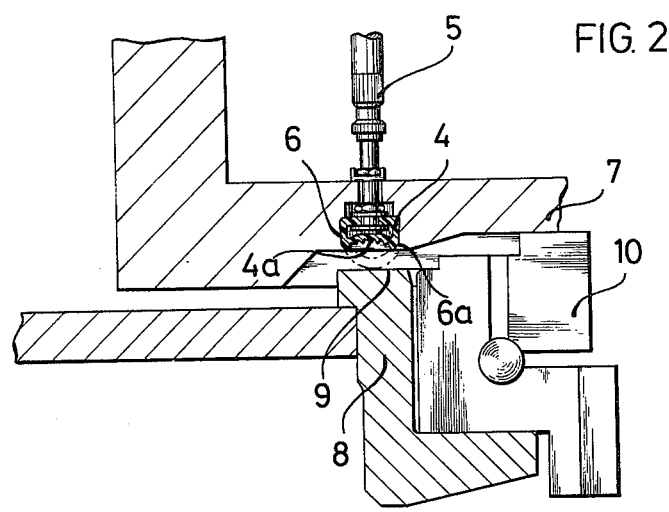
FIG. 2 is a detail of a vertical cross section taken through the joint between the turret and the chassis of the tank of FIG. 1, in the area of the rotating track.

In FIG. 2, details of the tubular seal disposed in the area of the turret rotating track are shown on an enlarged scale. The turret casing 7 rests on the rotating track 10 on the chassis. On the underside of the turret casing 7, a downwardly facing groove 6 is disposed concentrically with the axis of rotation of the turret, into which groove the tubular seal 4 is laid and is connected by the compressed air line 5 to the control center 2. A sealing surface 9 is disposed on the chassis 8 opposite the groove 6. The tubular seal 4 is represented in the collapsed state by the solid lines in FIG. 2. As it can be seen, it is so constructed that, in the collapsed state, it has a concave cross-sectional profile at its outer surface. It is thus that, in the collapsed state, it will be entirely contained within the groove 6 and will not be damaged by the rotation of the turret casing 7 on the chassis 8. Furthermore, the tubular seal 4 is provided on its outside with circumferential ribs 4a. If compressed air is fed through the compressed air line 5 to the tubular seal 4, the tubular seal becomes inflated and its outside becomes displaced to the position represented by broken lines in FIG. 2. In this position the tubular seal 4 is applied tightly to the sealing surface 9. The ribs 4a further contribute to the perfection of the seal. The sealing can be accomplished with the turret housing 7 in any desired position in relation to the chassis 8. After the compressed air line 5 has been decompressed, the tubular seal 4 retracts within the groove 6.

At the outer edge of the groove 6, lips 6a (size exaggerated in FIG. 2) are provided, which make the width of groove 6 slightly smaller at its surface edges than at its bottom. This prevents the tubular seal 4 from dropping out of the groove 6.

Figure 3:
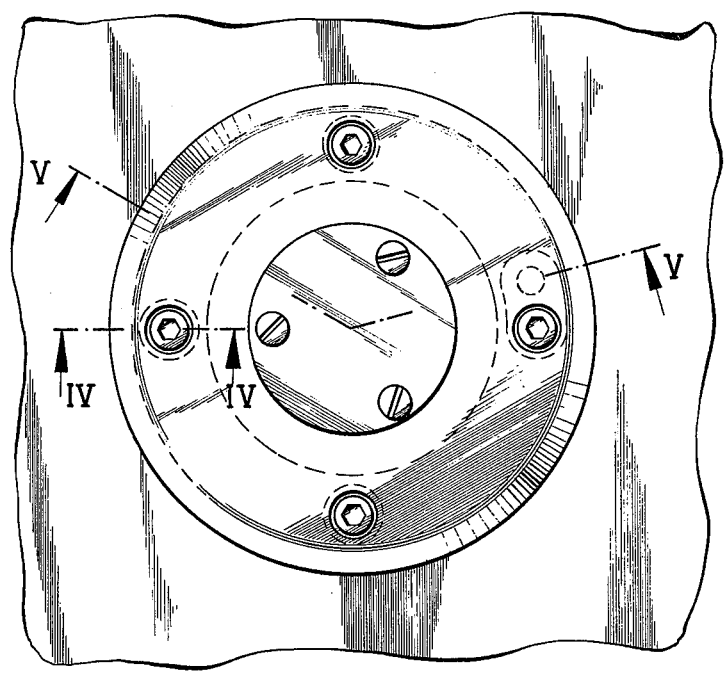
FIG. 3 is a top plan view of a ventilation opening disposed on the turret of the tank of FIG. 1.
Figure 4:
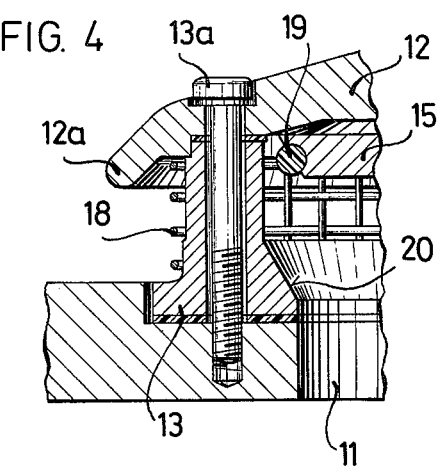
FIG. 4 is a cross-sectional view taken along line IV—IV of FIG. 3.

In FIGS. 3 to 5, one of the ventilation points 1 in the turret casing 7 of the vehicle of FIG. 1 is shown in greater detail.

In the turret casing 7 (FIG. 5) there is provided at ventilation point 1 a ventilation aperture 11 which is covered by a guard 12 which rests on posts 13 on turret casing 7 such that openings for the passage of air remain between the downturned rim 12a of the guard 12 and the outside surface of the turret casing 7 in the manner illustrated in FIG. 5. As it can be seen in FIG. 4, the guard 12 is attached to the turret casing 7 by bolts 13a (FIG. 4) passing through the posts 13.

The middle part of the guard 12 is in the form of an upwardly open cup 14 which is drawn inward towards the ventilation aperture 11. Beneath the cup 14 a valve cone 15 is provided between the guard 12 and the ventilation aperture 11, and is constructed in its middle portion such that it encompasses the outside of the cup 14, a sleeve gasket 16 being disposed on the valve cone 15 and applied to the outer surface of cup 14, thus preventing water or moisture from penetrating into the space between the valve cone 15 and the cup 14.

On the outer edge of the valve cone there is provided an O-ring 19 which, when the valve is in the closed state (represented by the broken lines in FIG. 5), is applied to the valve seat 20 disposed at the edge of the ventilation aperture 11, thus sealing the ventilation aperture against the entry of water or gas from the outside.

The operation of the valve cone 15 is effected by a compressed air piston 23 which is guided in the cup 14 and is connected to the valve cone 15 by a connecting rod 24 which passes through the bottom of the cup 14 and is affixed thereto by a nut 25. Between the compressed air piston 23 and the bottom of cup 14 there is disposed a compression spring 27 which urges the compressed air piston 23 towards the position in which valve cone 15 is open. The working surface of the compressed air piston 23 is connected by a diaphragm 21 to the outer margin of cup 14, so that no air can penetrate from above into the space between the compressed air piston 23 and the bottom of the cup 14. The radial size of this diaphragm is such that the compressed air piston 23 will be able to perform without interference from the diaphragm the stroke that is necessary for the closing of the valve cone 15. The cup 14 is closed airtight at its outer side by a cover plate 17 which can be fastened in place from the outside by means of bolts 17a. The space between the diaphragm 21 and the cover plate 17 is connected by a passage 28 in guard 12 and by a passage 22 through the wall of turret casing 7 and post 13 to the control center 2 (not shown in FIG. 5), which can thus connect the said space to the compressed air source 3. If the space between the diaphragm 21 and the cover plate 17 is fed with compressed air, the compressed air piston 23 will move downwardly against the action of the spring 27 until the valve cone 15 with O-ring 19 is firmly resting on the valve seat 20. The ventilation aperture 11 will thus be closed. If the compressed air is again released, the compressed air piston 23 will move upwardly under the action of the compression spring 27 and the valve cone 15 will rise from the valve seat 20. The ventilation aperture 11 will thus be reopened.

To permit an equalization of pressure between the space below the compressed air piston 23 and the space between valve cone 15 and cup 14, a vent 26 is provided in the bottom of cup 14.

The air passages between the downturned margin 12a of guard 12 and the outside surface of the turret casing 7 are protected by a circumferential grill 18, so that no large foreign bodies will be able to penetrate into the interior of the vehicle.

The ventilation valve represented in FIGS. 3 to 5 can be disassembled to its individual components without special tools. In this manner parts subject to wear, such as the sleeve gasket 16, O-ring 19, and diaphragm 21, can easily be replaced.

The seal in the area of the rotating ring, which is represented in FIGS. 1 and 2, and the ventilation valves represented in FIGS. 3 to 5, can be actuated simultaneously from the same control center 2, and their state of operation can be monitored on the instruments connected therewith.

What is claimed is:

1. An armored vehicle having an interior, said interior being in fluid communication via at least one temporarily-to-be-closed aperature with the exterior atmosphere around said vehicle, said vehicle being equipped with at least one ventilation aperature provided in an exterior wall defining the interior of said vehicle, said ventilation aperture comprising a ventilation valve in said aperture responsive to compressed air, said valve connected to a central operating system, said ventilation aperture having a protective device disposed thereon on the exterior thereof, said protective device being a flat guard disposed over the said ventilation aperture to leave at least one lateral passage on which said ventilation valve is disposed, said ventilation valve comprising a valve cone disposed between said flat guard and said ventilation aperture and a valve seat disposed on the margin of said ventilation aperture, said flat guard has a central, cup-like capacity, closable from without by a bolted-on cover plate, and in which a compressed air piston is guided which in turn is connected to said valve cone via a connecting rod disposed through the bottom of a cavity and whose working face is connected via a diaphragm to the outer edge of said cup, the radial size of said diaphragm being adapted to the given stroke of the piston and the space between the diaphragm and said cover plate being fillable with compressed air, and a compression spring disposed between said piston and the bottom of said cavity.

2. An armored vehicle according to claim 1 which is a tank having a turret disposed rotatably through a rotating track on a chassis, said turret having a groove in facing relationship to said chassis coaxially with the axis of rotation of said turret within said rotating track, said groove accomodating therein a tubular seal, said tubular seal connected to a source of compressed air whereby when said tubular seal is inflated by compressed air a portion thereof protrudes from said groove to abut said chassis and seal an opening between said turret and said chassis.

3. An armored vehicle according to claim 2 wherein the side of said tubular seal which abuts said chassis to form a seal has ribs running round about in its longitudinal direction.

4. An armored vehicle according to claim 3 wherein said tubular seal is so constructed that, in the pressure-free state, it is disposed entirely within said groove.

5. An armored vehicle according to claim 4 wherein said tubular seal in the pressure-free state has on the side facing said chassis a profile which is concave in its transverse direction.

6. An armored vehicle according to claim 3 wherein the cross-section of said groove is smaller adjacent the outer edge than adjacent its bottom.

7. An armored vehicle according to claim 1 wherein said valve cone encompasses said cup-like cavity, a sleeve gasket is disposed between the outside wall of said cavity and the inside wall of said valve cone.

8. An armored vehicle according to claim 7 wherein the passages between the said guard and the ventilation aperture are provided with a protective grill.

* * * * *